E. SILBERBERG.
WHEELED POTATO DIGGER.
APPLICATION FILED JULY 8, 1914.

1,159,110.

Patented Nov. 2, 1915.
4 SHEETS—SHEET 1.

E. SILBERBERG.
WHEELED POTATO DIGGER.
APPLICATION FILED JULY 8, 1914.

1,159,110.

Patented Nov. 2, 1915.
4 SHEETS—SHEET 4.

UNITED STATES PATENT OFFICE.

ERNEST SILBERBERG, OF ROCHESTER, NEW YORK.

WHEELED POTATO-DIGGER.

1,159,110.   Specification of Letters Patent.   Patented Nov. 2, 1915.

Application filed July 8, 1914. Serial No. 849,745.

*To all whom it may concern:*

Be it known that I, ERNEST SILBERBERG, a citizen of the United States, residing at Rochester, in the county of Monroe and State of New York, have invented certain new and useful Improvements in Wheeled Potato-Diggers, of which the following is a specification.

This invention relates to certain new and useful improvements in wheeled potato diggers.

An object of the present invention is to provide a potato digger in connection with a wheeled carriage that may be easily and quickly adjusted as to height and be retained in adjusted position.

A further object of the invention is to provide a wheeled potato digger in which the potato plow and other mechanism is vertically adjustable in the carriage frame with means arranged adjacent the driver's seat for controlling the elevating movement of the movable parts.

A still further object of the invention is to provide a wheeled potato digger in which the frame carries stone separators in advance of the potato plow, with a weed separator arranged above the plow and pivotally-mounting the plow so that the depth of cut may be controlled.

With the above general objects in view and others that will appear as the nature of the invention is better understood, the same consists in the novel construction, combination and arrangement of parts to be hereinafter more fully described and then claimed.

Figure 1:
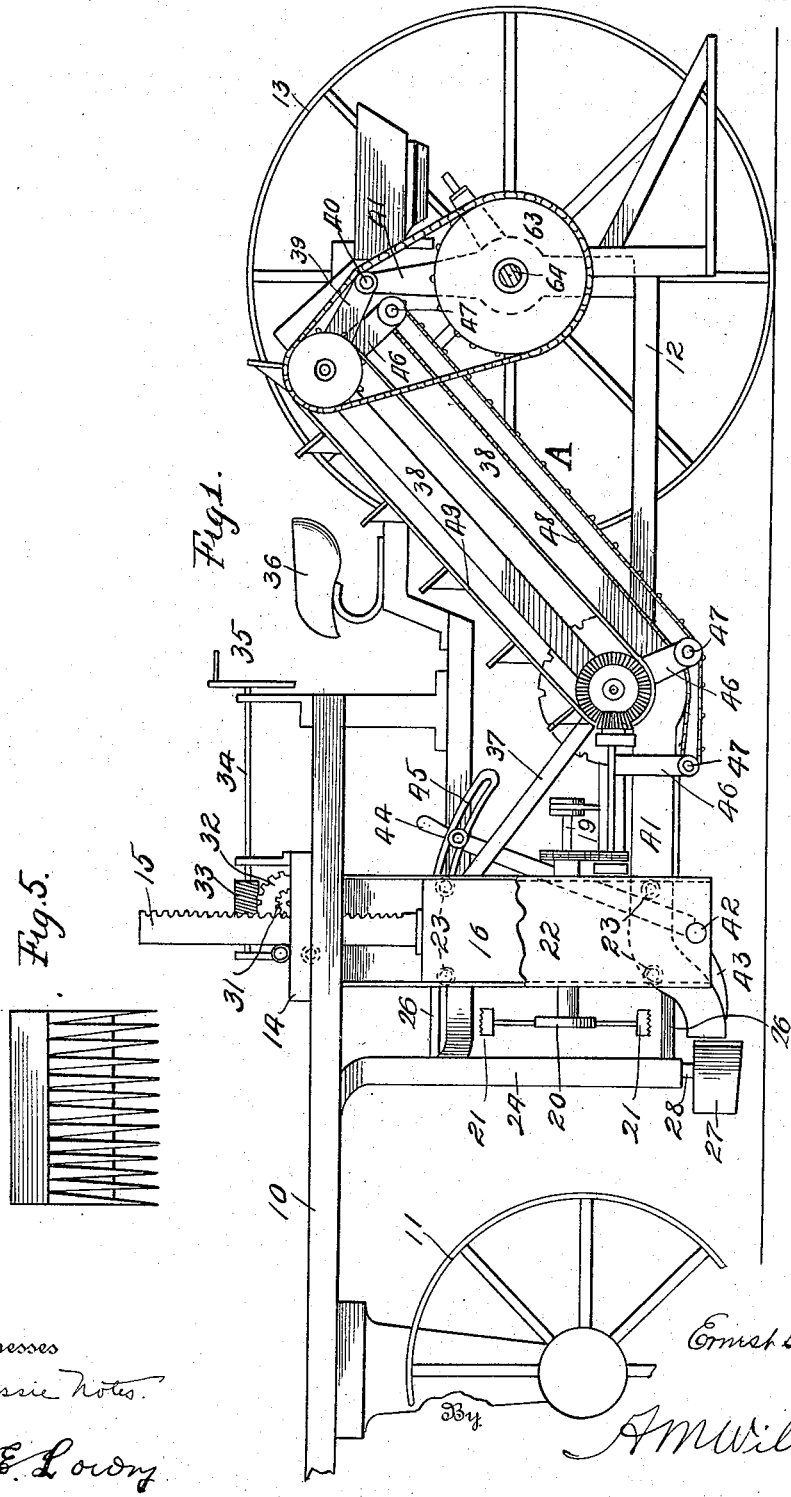
Figure 2:
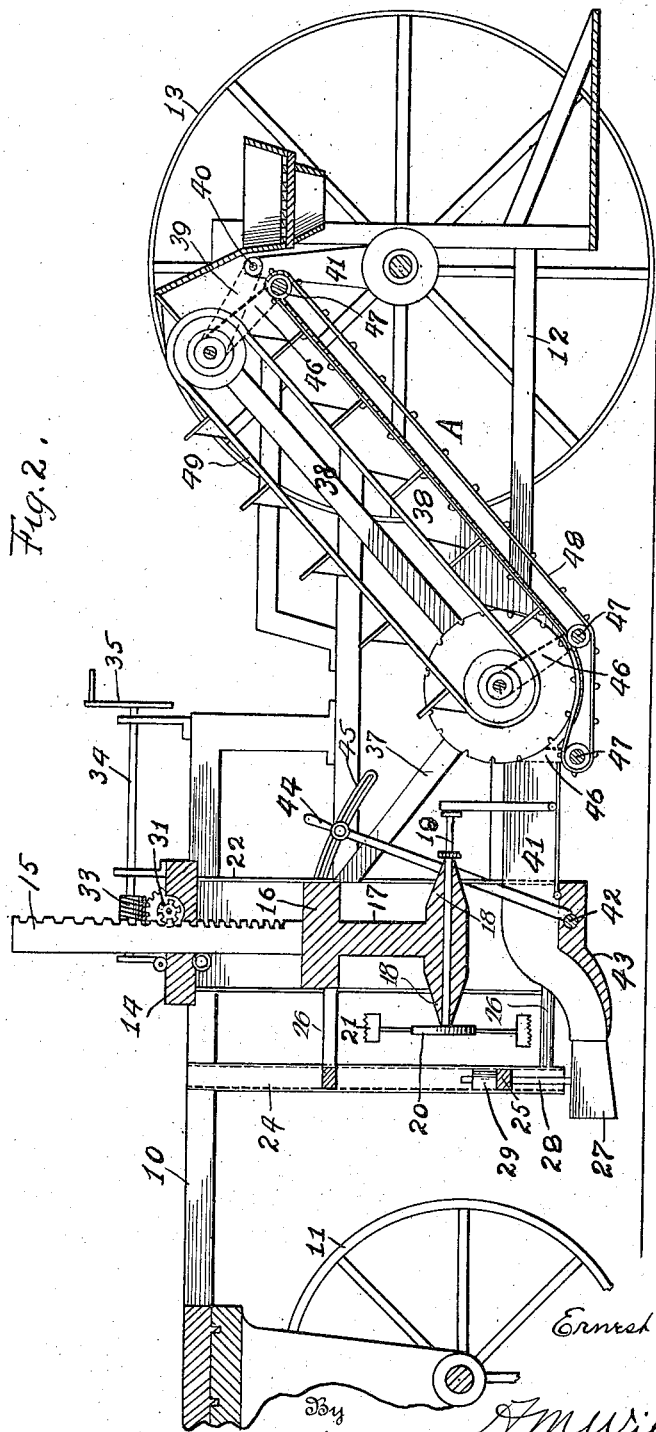
Figure 3:
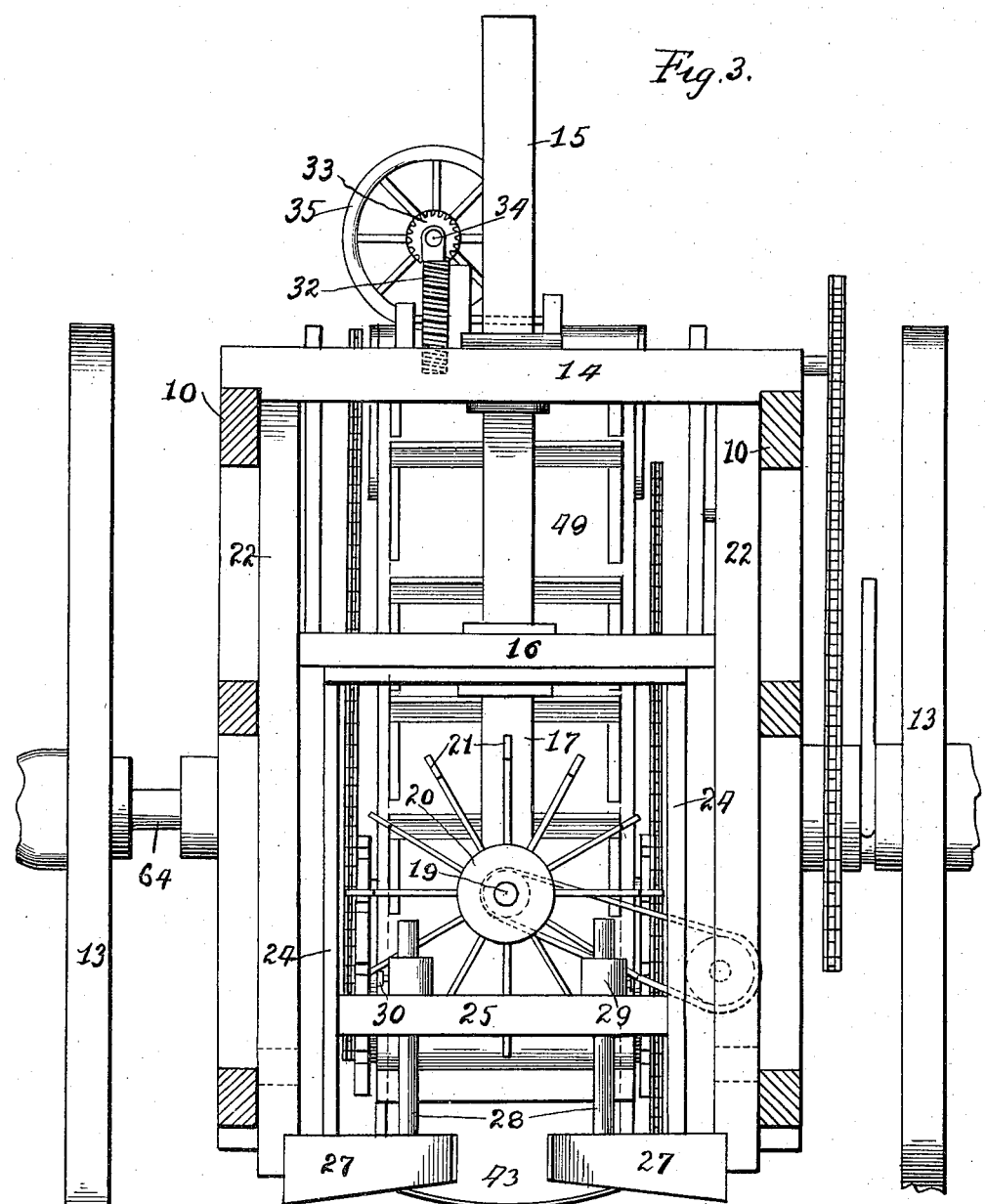
Figure 4:
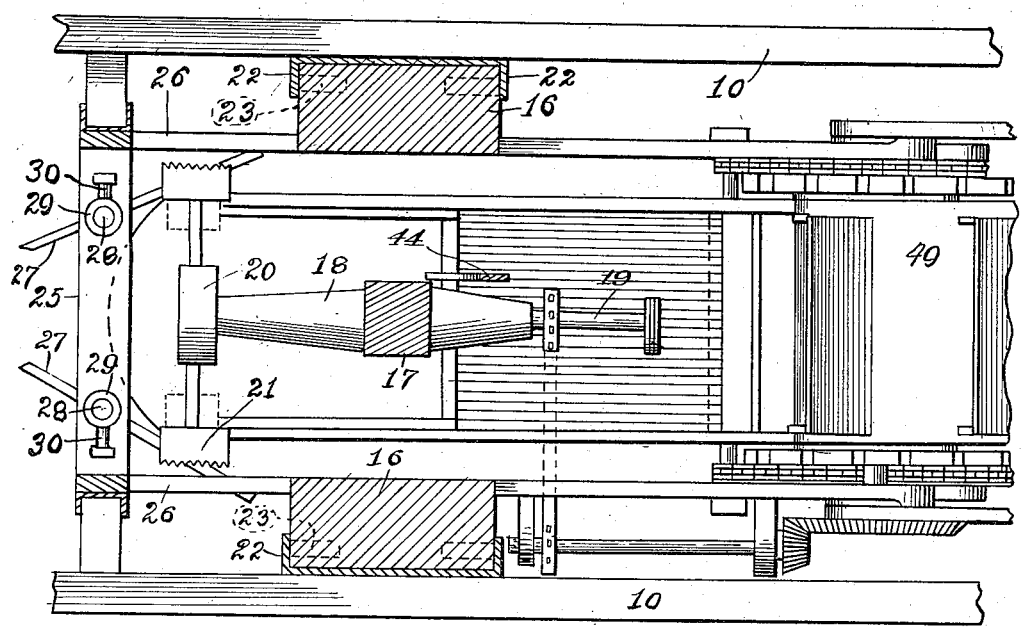

In the accompanying drawings which show the preferred embodiment of the present invention and to which reference is had herein by like characters designating corresponding parts throughout the several views:—Figure 1 is a side elevational view of my improved wheeled potato digger, with a portion of the frame broken away. Fig. 2 is a longitudinal sectional view of the same. Fig. 3 is a vertical cross-sectional view through the forward portion of the carriage frame, better illustrating the stone separator and weeders. Fig. 4 is a horizontal sectional view of the middle portion of the machine, illustrating the manner of guiding mechanism for elevating the plow, etc. Fig. 5 is a plan view of a stone gatherer to be used in lieu of the potato plow.

Briefly described, the invention consists of a wheeled potato digger embodying a carriage frame for supporting the potato digging mechanism, the frame being constructed to provide a vertical guide for a vertically movable member which has connection with the potato plow and the means for feeding the potatoes to the sorting box.

Referring more in detail to the accompanying drawings, the reference numeral 10 designates the main portion of the forward carriage frame connected at its forward end by the usual fifth wheel connection to the front wheels 11, while the rear frame portion 12 is supported on the rear wheels 13, the rear wheels constituting the driving medium for the potato conveying belts. The forward frame sections 10 as shown in Fig. 3, are provided with a cross-bar 14 having an opening therein through which extends a rack bar 15 connected at its lower end to an inverted U-shaped frame 16. Depending from the upper section of the U-shaped frame portion is a hanger 17 carrying at its lower end an elongated bearing 18 for a shaft 19, the said shaft carrying at its forward end a disk 20 provided with weeder arms 21. The frame 16 is mounted to move vertically in the guides 22 carried by the sides of the frame 10, and carries anti-friction rollers 23 engaging the said guides 22. The frame 10 carries depending guide members 24 constituting a guide for the cross-bar 25, the cross-bar being connected to the U-shaped frame 16 by the forward extensions 26. Stone separators are carried by the cross-bar 25, and as shown in the drawings, are arranged in advance of the potato plow, the stone separators comprising the body sections 27 provided with shafts 28 extending upwardly through the cross-bar 25 and the sockets 29 and secured in position by thumb screws 30 engaging the same.

The mechanism for raising the U-shaped frame 16 in the angle guides 22 consists of a pinion 31 engaging the rack bar 15 and carried on one end of a shaft which carries on its other end a worm wheel 32 in mesh with a worm 33 on the shaft 34, the shaft being rotated by a hand wheel 35 positioned adjacent the driver's seat 36. By operating the hand wheel 35 the pinion 31 which is driven thereby will elevate the rack bar 15 that carries the U-shaped frame 16.

As shown in Figs. 1 and 2, the frame 16 has rearwardly-extending braces 37 connected to the side frames 38, the side frames carrying an arm 39 that has a pivotal connection 40 with an upright supporting member 41. It is to be understood that when the frame 16 is elevated, the side frames 38 carrying the potato conveying mechanism will move on the pivot point 40 and be elevated with the said frame.

The side frames 38 extend forwardly as at 41 and carry a transverse shaft 42 on which is pivoted a potato plow 43, the angularity of the plow being controlled by a lever 44 held in adjusted position in a segment 45. This arrangement is used to deliver the potatoes to a suitable elevator and separator indicated in general at A mounted at the rear of the machine.

In Fig. 5, I have illustrated a form of stone gatherer 71 which may be used in connection with this machine in lieu of the plow 43, when it is desired to remove stones or other obstructions from the surface of the ground in the spring of the year preparatory to the usual tilling of the soil.

The operator on the seat 36 has complete control of the plow and the elevating mechanism, the frame 16 carrying the rack bar 15, being moved in the vertical guides 22 by the pinion and worm connection to the hand wheel 35. When the frame 16 is elevated, the extension arms 26 carrying the cross-bar 25 are also moved with the stone separators in the guides 24, with the side frame sections 38 and 41 carrying the platform belt 48 and feed belt 49, all moving on the pivot 40 of the support 41.

In operation, the stone separators 27 being in advance of the plow 43 will clear the surface of the ground and permit the plow to gather the potatoes. The revolving weeder 21 arranged above the plow is adapted to remove the weeds and tops of the potatoes before the same reaches the elevator.

While the forms of the invention herein shown and described are what are believed to be preferable embodiments thereof, it is nevertheless to be understood that various forms, modifications and arrangement of the parts as shown may be had without departing from the spirit and scope of the invention as claimed.

What I claim as new is:—

1. In a device of the class described, a wheeled carriage, a frame mounted for vertical movement on said carriage, a tiltable plow mounted at the lower end of said frame, a quadrant mounted on said frame and movable therewith, and a lever coöperating with said quadrant and connected to said plow to adjust the same.

2. In a device of the class described, a wheeled carriage, a frame mounted for vertical movement on said carriage, a tiltable plow mounted at the lower end of said frame, a quadrant mounted on said frame and movable therewith, a rotary weeder journaled on and movable with said frame, said weeder being located above the free end of said plow.

3. In a device of the class described, a wheeled carriage, a frame vertically movable in said carriage, a weeder journaled in and movable with said frame, means to move the frame, stone separators, and an adjustable connection between the stone separators and the frame whereby to move said separators to and from said weeder.

In testimony whereof I affix my signature in presence of two witnesses.

ERNEST SILBERBERG.

Witnesses:
B. PIOTTER,
JACOB HOCHSTEIN.

Copies of this patent may be obtained for five cents each, by addressing the "Commissioner of Patents, Washington, D. C."